A. H. LUHRMAN.
STORAGE BATTERY CONNECTION.
APPLICATION FILED NOV. 23, 1917.

1,312,038.

Patented Aug. 5, 1919.

Witnesses:
W. Thornton Bogert
A. Kasson

Inventor:
Albert H. Luhrman
By Walter F. Murray
Attorney

UNITED STATES PATENT OFFICE.

ALBERT H. LUHRMAN, OF CINCINNATI, OHIO.

STORAGE-BATTERY CONNECTION.

1,312,038.   Specification of Letters Patent.   Patented Aug. 5, 1919.

Application filed November 23, 1917. Serial No. 203,474.

*To all whom it may concern:*

Be it known that I, ALBERT H. LUHRMAN, a citizen of the United States of America, and resident of Cincinnati, in the county of Hamilton and State of Ohio, have invented a new and useful Improvement in Storage-Battery Connections, of which the following is a specification.

An object of my invention is to produce an improved storage battery connection adapted to eliminate the objectionable loosening of battery terminals due to vibration, and also the objectionable seepage of acid from the battery cell.

A further object is to produce an improved storage battery connection adapted to give perfect electrical connection between the connected cells and other elements.

These and other objects are attained in the battery connection described in the following specification and illustrated in the accompanying drawing in which.

Figure 1:
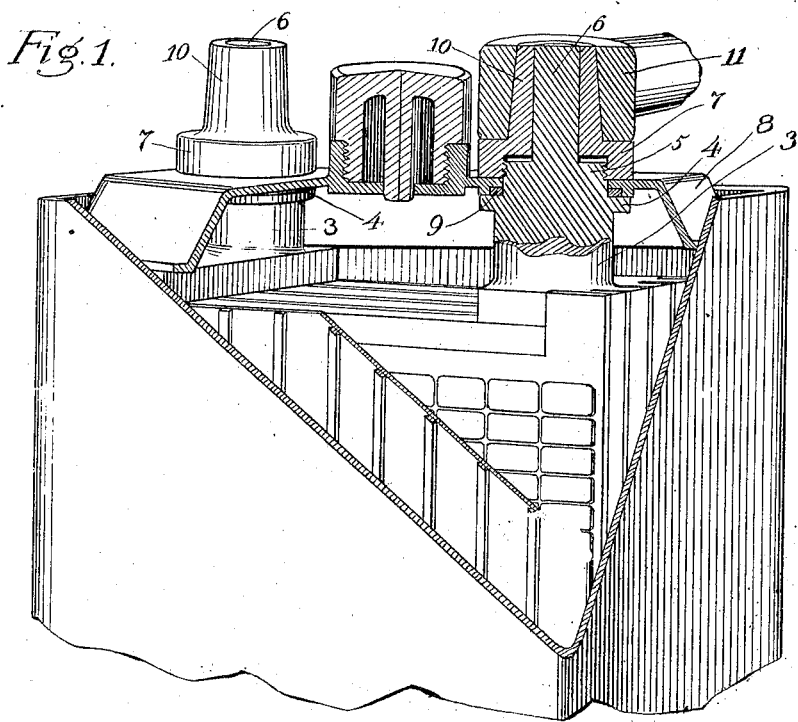
Figure 1 is a fragmental perspective view of a storage cell having a connection, shown fragmentally and in section, attached thereto.

My improved battery connection consists of a plate spacing and connecting element 3 having a flange 4 with a screw threaded portion 5 located above the flange and an upwardly extending stem 6 projecting beyond screw threaded portion 5. A nut 7 is provided to receive screw threaded portion 5 so that the cover 8 of the battery cell may be clamped between this nut and a washer 9 located upon flange 4. Nut 7 is provided with an upwardly extending conically shaped portion 10 which is provided with an aperture extending through it for the purpose of receiving stem 6. Each connector bar 11 of the battery is provided with a conically shaped opening in each of its ends to receive the conically shaped upward extension 10 of nut 7 of adjacent cells.

Figure 2:
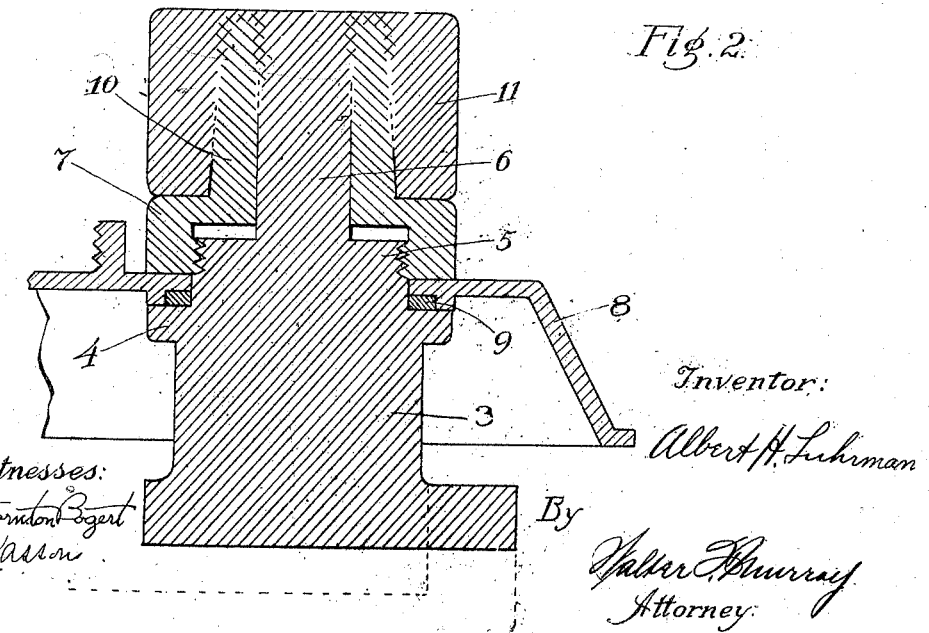
Fig. 2 is a fragmental sectional view upon an enlarged scale of a battery connection embodying my invention.

In connecting a connector bar with a cell by means of my improved battery connection it is necessary first to tighten nut 7 upon the cell cover to cause washer 9 to be compressed between flange 4 and the cover in order to prevent seepage of acid from the cell. Connector bar 11 is then fitted over extension 10 and a blow pipe flame is turned upon the upper surfaces of stem 6, extension 10, and bar 11. This results in the metal of each of these elements, which are of lead, being fused so as to form a single piece as disclosed in Fig. 2. The advantage of such a connection lies in the elimination of any tendency for nut 7 to loosen with relation to spacer 3 and thereby prevents seepage of acid from the cell. A further advantage lies in the provision of a joint which is electrically perfect and one which will not loosen from vibration.

Having thus described my invention, what I claim is:

A battery connection consisting of a plate holder having a reduced upper end, a flange and a screw-threaded portion between the reduced end and the flange, a cover resting upon the flange, a nut engaging the screw-threads clamping the cover against the flange and having an extension fitting the reduced end, and a connector bar having a bore fitting the extension of the nut, the reduced end of the plate holder, the nut and the bar being fused together.

In testimony whereof, I have hereunto subscribed my name this 21st day of November, 1917.

ALBERT H. LUHRMAN.

Witnesses:
 WALTER F. MURRAY,
 W. THORNTON BOGERT.